June 30, 1936.  O. RUEHMANN  2,045,966
FIRE HOSE SUPPORT
Filed Oct. 20, 1934
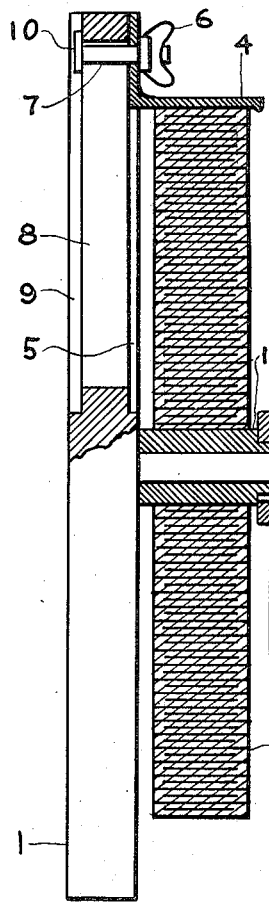
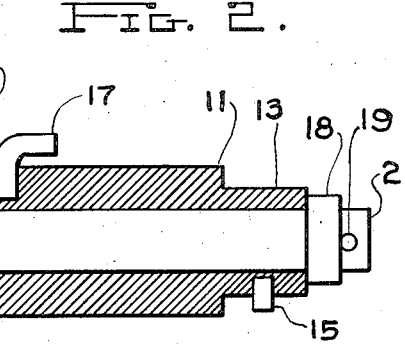
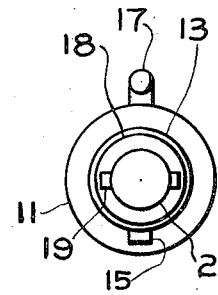
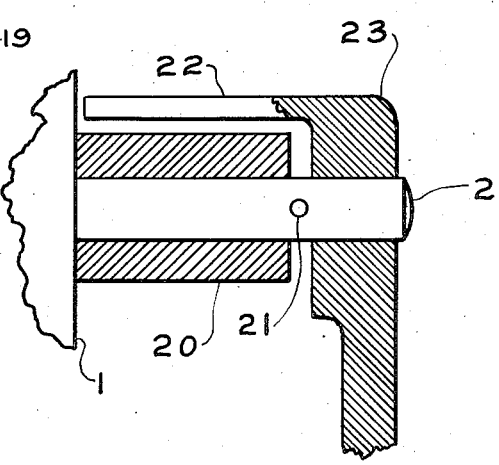
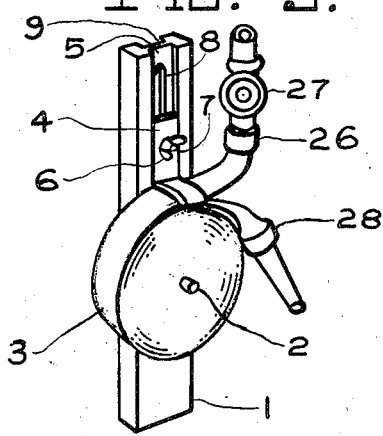
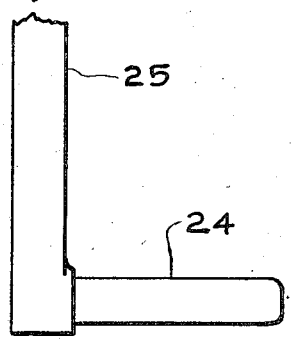
INVENTOR:
Otto Ruehmann,
By: Otto H. Ruger,
his Atty.

Patented June 30, 1936

2,045,966

UNITED STATES PATENT OFFICE 2,045,966

FIRE-HOSE SUPPORT

Otto Ruehmann, Los Angeles, Calif.

Application October 20, 1934, Serial No. 749,212

4 Claims. (Cl. 242—86)

This invention relates to fire protection apparatus in general, and more specifically to a holder for fire hose.

It is an object of this invention to provide a holder for fire hose upon which the hose may be quickly and easily mounted.

It is a further object of this invention to provide a holder for fire hose from which the hose may be quickly and easily removed.

It is a further object of this invention to provide a holder for fire hose that is readily mounted upon and demounted from a wall or other suitable part of a building.

Other objects will appear from the following description and appended claims as well as from the accompanying drawing wherein:

Fig. 1 is a side elevation in part section showing an embodiment of the invention.

Fig. 2 is a fragmentary section of the central portion of the device of Fig. 1, somewhat enlarged.

Fig. 3 is an end view of the portion shown in Fig. 2 with certain elements removed.

Fig. 4 is a section corresponding to that of Fig. 2 of a somewhat modified embodiment of the invention, and Fig. 5 is a perspective view of the embodiment of this invention, shown ready for use.

A base 1, supports a pin 2 adapted to receive a roll of fire hose 3. If merely left hanging on pin 2, the hose 3 might unroll or slip off of pin 2, which would be very undesirable. To properly support the roll of hose 2, a clamp piece 4 is provided, adapted to engage the top, or outside, or perimetric surface, of the roll of hose 3, thereby retaining it in place on pin 2. It is at once apparent to those skilled in the art that the base 1 might be a block of wood, or a metal stamping, or a metal or composition casting. The material and exact form and proportions of this, as well as the other parts of the device being described are matters for the engineer entrusted with the construction of any particular embodiment and need not be specified here.

The clamp piece 4 slides in a groove 5 cut in base 1, and is locked to base 1 by means of thumb-nut 6, coacting with bolt 7. A slot 8 is cut in base 1 to permit of the free sliding therein of bolt 7, thereby affording adjustment of the location of clamp piece 4, to accommodate a larger or smaller roll of hose 3. Another groove 9 is cut in the back of base 1 corresponding to groove 5, and a large flat head 10 is provided on bolt 7, adapted to slide non-rotatably in groove 9, clearing any obstruction that might normally be located behind base 1.

To facilitate the mounting of hose 3 on pin 2, a roller or sleeve 11 may advantageously be provided, freely rotatably mounted on pin 2, with the added advantage that the somewhat larger diameter of this roller 11 favors the rolling of hose 3, by furnishing it with a larger initial or core diameter, and as fire hose may be somewhat stiff, it might be rather more difficult to start it over a small diameter pin.

Wrapping the hose 3 on roller 11 with the hands might at times be found somewhat difficult, so, to further facilitate the mounting of the hose 3 on roller 11, a crank 12 might be provided, and roller 11 constructed with a shoulder portion 13 adapted to receive crank 12. Here, a keyway 14 is cut in crank 12 adapted to engage pin 15 driven into the shoulder portion 13, by means of which the crank 12 may impart rotational motion to roller 11. The crank arm 16 is shown broken, but it would naturally be provided with a handle not shown. A hook 17 might well be secured to roller 11 in a manner to engage the hose 3, and upon the rotation of roller 11 to start hose 3 rolling up on roller 11. This hook 17 is constructed so as to engage from the rear side in the bight of a folded-up hose and so that the hose may be removed axially from the pin, roller, and hook, ready for immediate use. To prevent roller 11 from being pulled off of pin 2 when hose 3 is dismounted, a collar 18 and pin 19 are provided.

The crank 12 would advantageously be removed from engagement with roller 11 as soon as the hose 3 had been wrapped in place and clamped by clamp piece 4, and hung under the roll of hose 3 or in any other convenient location. Also, it might be profitable to provide one crank 12, to serve a number of hose supports in certain installations.

The hose 3 is properly engaged at about its mid-point with hook 17 and roller 11, thus the coupling end 26 of hose 3, which might be attached to a valve 27 or other attachment, and the nozzle end 28 of the hose 3 are both found on the outside of the roll when hose 3 is in place.

According to the slightly modified embodiment shown in Fig. 4, the pin 2 serves to support a plain cylindrical or even perhaps conical roller 20, which, if of the conical form has the smaller diameter facing outward to allow of the easier dismounting of the roll of hose 3. A pin 21 retains roller 20 on pin 2, preventing its slipping off of pin 2 when the roll of hose 3 is removed. In this case, rather than a hook 17 secured to roller 11, as in Fig. 2, a plain roller 20 is provided and a hook member 22 is made integral with a crank member 23 which is adapted to be placed on the outward extremity of pin 2. In this case, hook 22 carries hose 3 causing it to wrap over roller 20. When hose 3 is in place, crank 23 operated by handle 24 and crank arm 25, is slipped off of pin 2, carrying with it hook 22, which therefore can offer no obstruction to the free removal of hose 3 when desired. Again, in this embodiment, the crank 23 might advantageously be hung in a convenient location as hereinbefore indicated.

The crank 23 might be a casting, or might be built up of a stamping and castings, or made by any other desired well known constructions which are immaterial so long as the crank 23 as constructed functions as described.

The base 1 may be provided with screw holes, hooks, mounting lugs or any other well known means for securing it to the wall, to a post, or to any other suitable portion of a building, and when desired, the entire device as a unit is readily demountable to remove it to some other location.

It should be borne in mind that as soon as clamp 4 is loosened, the roll of hose 3 is practically ready to fall off, and is readily taken off for use, while so long as clamp 4 is tightened in place, the hose 3 will remain in place on the support.

Having described my invention, I claim:

1. In an apparatus of the class described, a base, a pin with one end mounted on the base and with the other end projecting freely from the base adapted to receive a roll of hose and so that the hose may be removed from the pin and base in rolled-up condition, the base embodying means for a guide in a radial relation to the pin, and a clamp adjustably mounted on the base in operative relation to said guide and adapted to frictionally engage the rolled-up hose on the pin.

2. In an apparatus of the class described, a base, a pin with one end mounted on the base and with the other end projecting freely from the base, a roller rotatably mounted on the pin and designed to receive a hose so that the hose may be removed in rolled-up condition, the base embodying a guide in radial relation to the pin, and a clamp adjustably mounted on the base in operative relation to said guide and adapted to frictionally engage the rolled-up hose on the pin.

3. In an apparatus of the class described, a base, a pin with one end mounted on the base and with the other end projecting freely from the base, a roller rotatably mounted on the pin and designed to receive a hose so that the hose may be removed in rolled-up condition, a hook on said roller to engage in the bight of a folded-up hose for the initial winding of the hose on the roller, the base embodying a guide in radial relation to the pin, and a clamp adjustably mounted on the base in operative relation to said guide and adapted to frictionally engage the rolled-up hose on the pin.

4. In an apparatus of the class described, a base having a pin with one end projecting freely therefrom to rotatably support a hose so as to be removable axially in rolled-up condition, and manually operative means removably mounted on the front end of the pin and including an engaging member forming a rigid part of the means and designed to engage in the bight of a folded-up hose for winding the folded-up hose upon the pin of the base and so that the means can be removed from such engagement as soon as the hose is fully wound about the pin so that the hose may be free to be removed from the pin axially.

OTTO RUEHMANN.